Sept. 12, 1967 L. M. F. DELASALLE 3,340,822
TRACK SWITCHING DEVICE FOR AIR CUSHION VEHICLES
Filed June 1, 1965 4 Sheets-Sheet 4

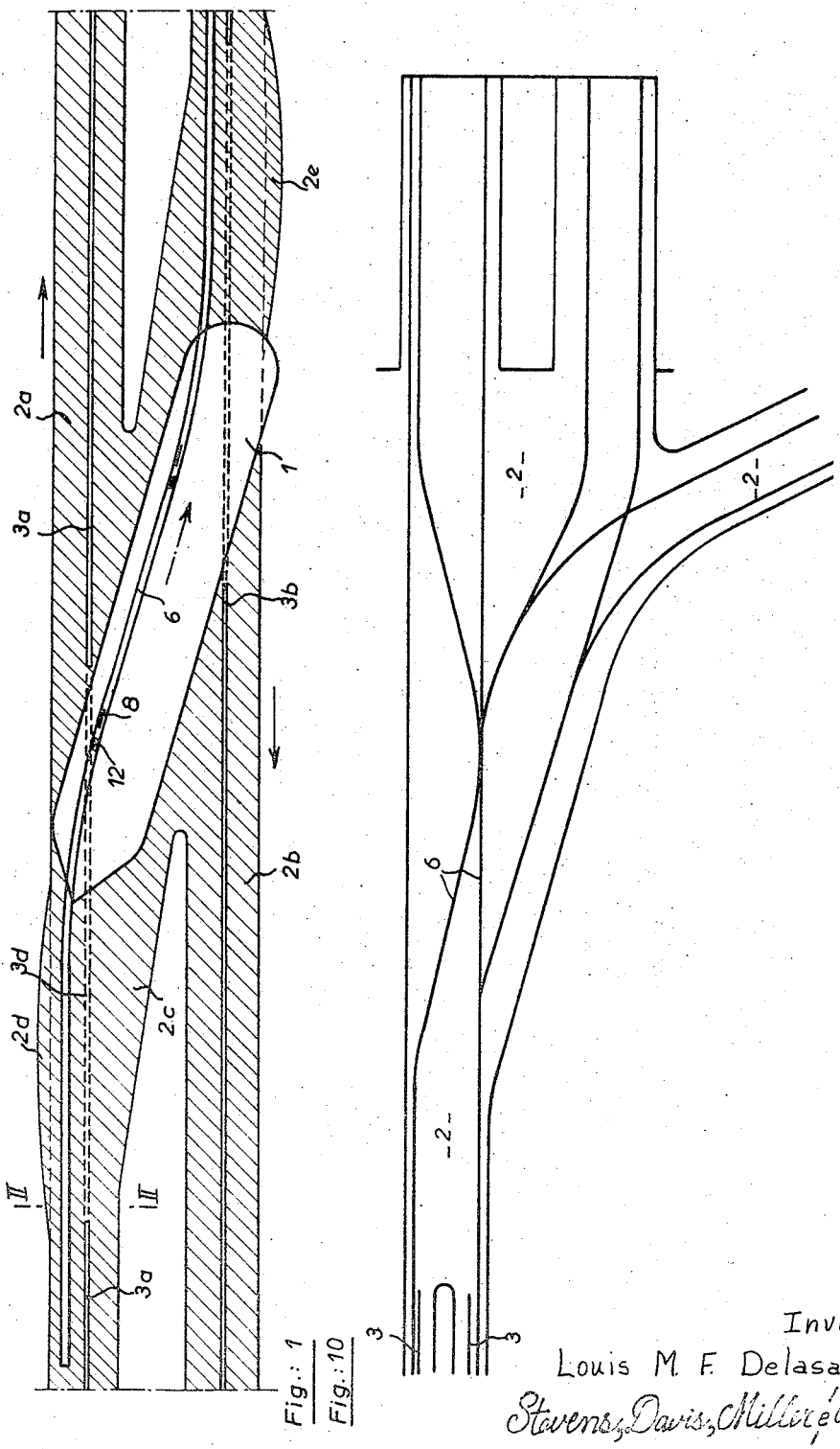

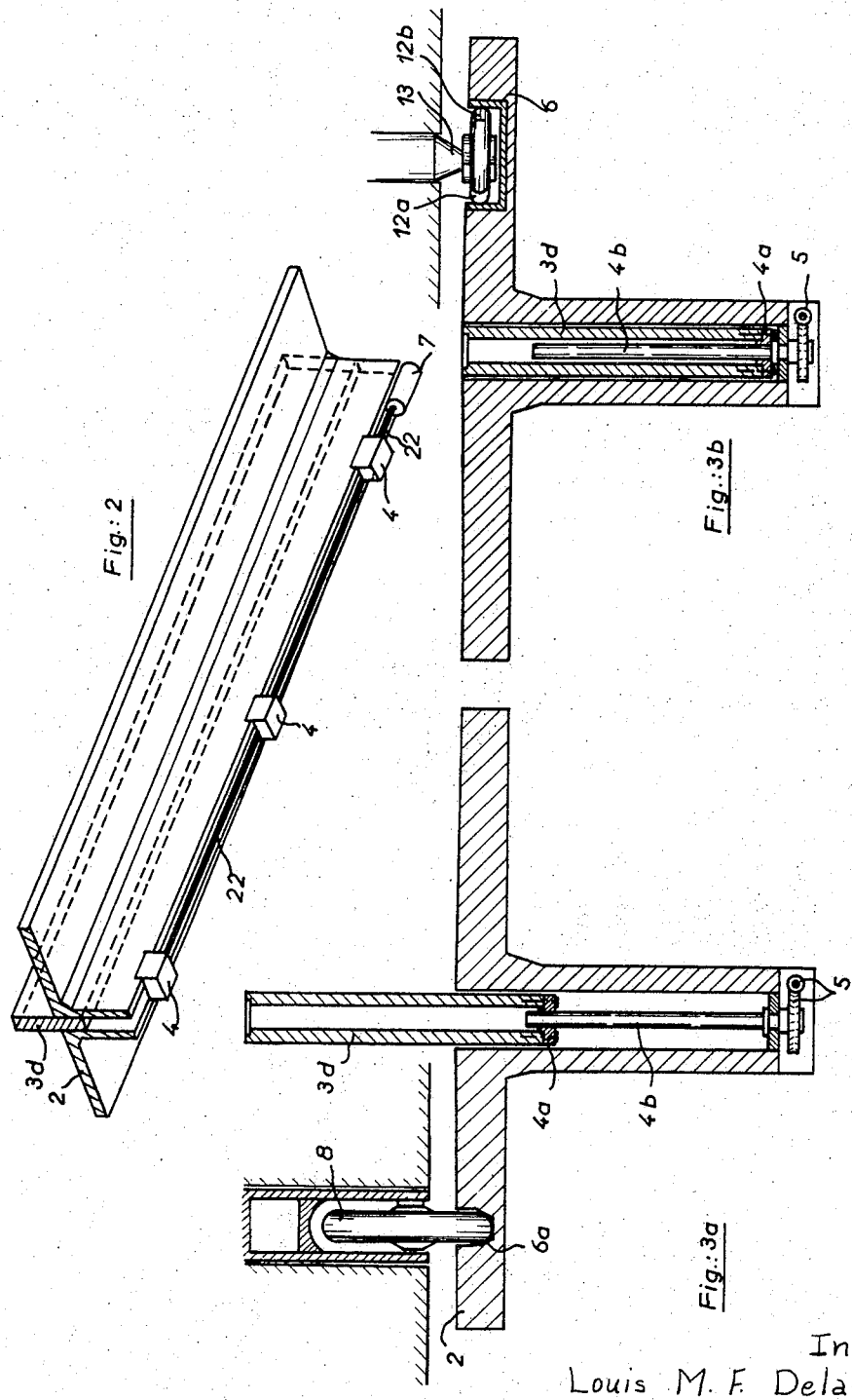

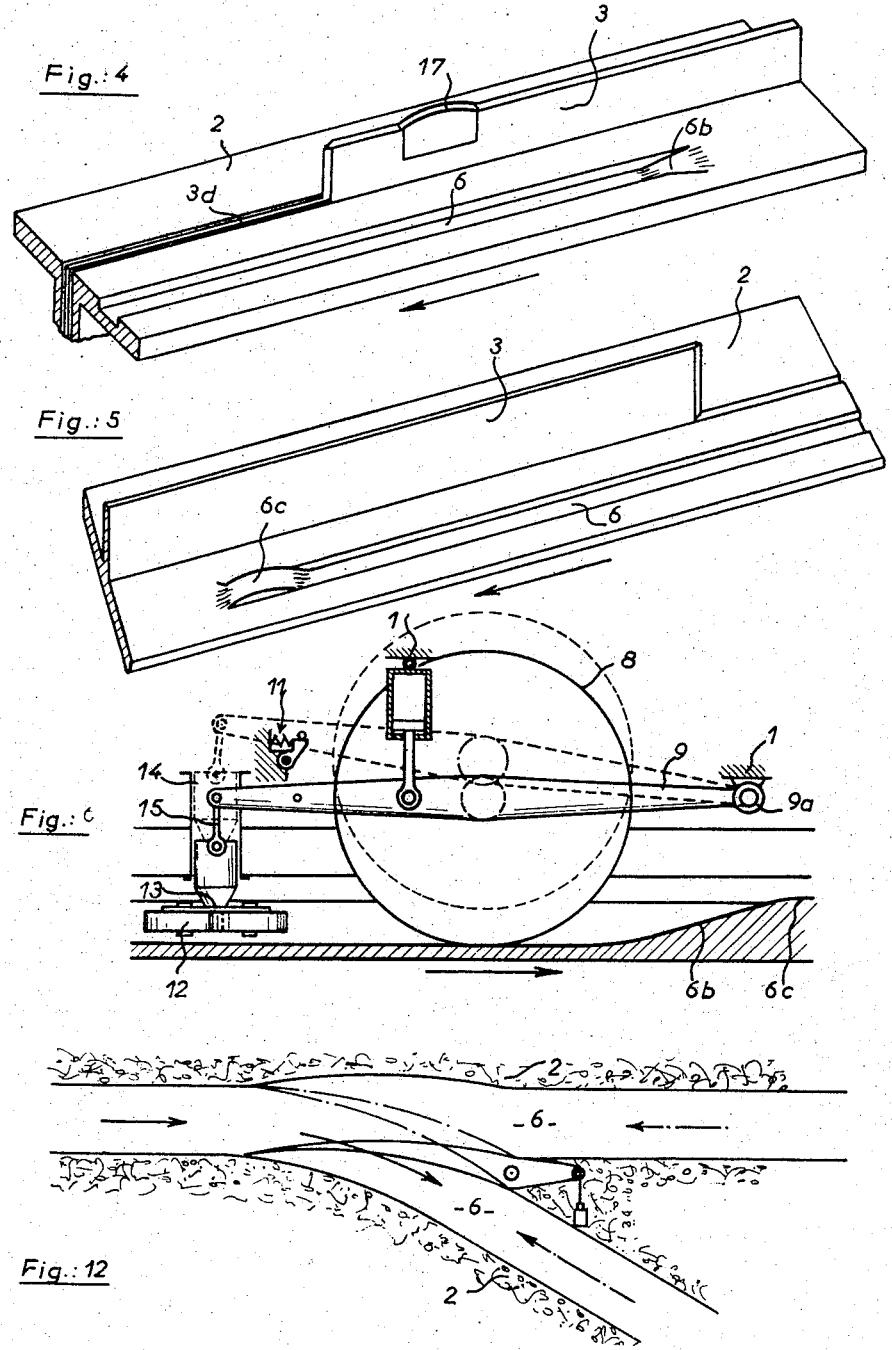

Inventor
Louis M. F. Delasalle
Stevens, Davis, Miller & Mosher
Attorneys

United States Patent Office 3,340,822
Patented Sept. 12, 1967

3,340,822
TRACK SWITCHING DEVICE FOR AIR CUSHION VEHICLES
Louis Marie Francis Delasalle, Paris, France, assignor, by mesne assignments, to Societe d'Etudes de l'Aerotrain Plaisir, Seine et Oise, France, a corporation of France
Filed June 1, 1965, Ser. No. 460,411
Claims priority, application France, June 4, 1964, 977,109
20 Claims. (Cl. 104—130)

ABSTRACT OF THE DISCLOSURE

A multi-section track for ground effect machine, having an interconnecting track switching portion with a guide groove formed on the bearing surface thereof to accommodate a guide member retractably carried by the machine and projectable therefrom to engage said groove during marshalling of the machine.

Patent No. 3,190,235 to Bertin et al. and patent application Ser. No. 436,786 also to Bertin et al. and assigned to the present assignee both describe a vehicle which is supported and guided by multiple air cushions and an associated track of preferably inverted T-section. The vehicle is normally guided along such a track by means of air cushions positioned on either side of the central rail represented by the leg of the T-section.

The present invention has for its object to provide a device which enables a vehicle to move from one such track to another, and accordingly consists in at least temporarily eliminating said central guide rail by rendering the same retractable, for example, over the length of the switching or track-changing device, the retraction being effected into a cavity provided for the purpose. The invention further consists in providing at the same time, over a substantially horizontal supporting portion of the track, at least one groove serving as an auxiliary guide rail, with which cooperate guide wheels or rollers which are carried by the vehicle and are normally raised. Since such a groove cannot occupy the location of the guide rail and is necessarily positioned on one side of the track either the auxiliary guide members carried by the vehicle, or else the associated groove, are duplicated and used alternately in the two directions of travel along the track.

In the case of station points, the central rail can be dispensed with entirely instead of being merely retracted temporarily, with the track leading onto an at least substantially flat maneuvering apron embodying an appropriate pattern of guiding grooves.

In the case of points along a main track, the temporary lowering of a portion of the guide rail can be combined with the fetching into position of an auxiliary guide rail which is raised to the same extent but is of different planform, for providing similar support for the guiding air cushions.

The major advantage of the subject device of the invention stems from the fact that the track portions providing auxiliary guidance are positioned beneath the bearing surface of the air cushions, operation of which remains unaltered.

The description which follows with reference to the accompanying non-limitative exemplary drawing will give a clear understanding of how the invention can be carried into practice, all such features as emerge from the description or the drawings obviously falling within the scope of the invention.

In the drawings,

FIGURE 1 is a schematic plan view on a reduced scale of a system of points on a main track according to the invention;

FIGURE 2 is a perspective schematic underneath view of a track portion comprising a retractable middle rail.

FIGURES 3a and 3b are cross-sectional views on an enlarged scale of such a track portion, showing the middle rail in the raised and retracted positions, respectively, and two auxiliary track and guide-wheel devices;

FIGURES 4 and 5 show in perspective the relative arrangements of the main and auxiliary guiding systems;

FIGURE 6 is a side elevation view of part of an auxiliary guiding system carried by a vehicle;

FIGURE 10 is an exemplary plan view of a track terminal system, with a station and feeder lines leading to sheds or workshops;

FIGURE 12 is a diagrammatic illustration of an automatic switching system usable for the network of auxiliary guide-tracks.

Figure 8:
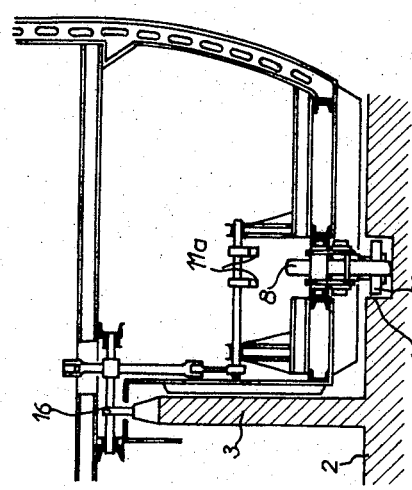
FIGURES 7 through 9 show an alternative constructional form, as seen from beneath, in front elevation and in side elevation, respectively.

Referring first to FIGURE 1, there is shown thereon a vehicle 1 in the process of moving from one track section to another track section along an interconnecting track portion extending between and merging with these sections. The normal direction of travel along the tracks is shown by an arrow drawn in solid lines. The points in the main track permit travel in the opposite direction (shown in dot-dash lines) along a section of the track, notably when the parallel track is not usable. The constructional details of the vehicle are shown in FIGURES 6 through 9, while those relating to the manner of constructing the track are shown on the other figures.

Each track consists of a supporting portion 2 having an at least substantially horizontal surface, and a middle rail 3, with the air cushions used for supporting and guiding the vehicle being positioned facing the upper surfaces of the horizontal portions 2 and the lateral surfaces of the rail 3, respectively. The rails 3a, 3b of two tracks are locally interrupted over the length of the switching device, and a connecting surface 2c joins the supporting portions 2a and 2b. Locally broadened portions 2d and 2e prevent possible momentary pressure reductions in some of the lifting air cushions when the vehicle 1 passes from one track to the other over the connecting surface 2c.

Reference is next had to FIGURES 2, 3, 4, 5 and 11 for detail views of the guiding system forming part of the points. A guide-rail portion 3d is supported by synchronized jacks 4 which enable it to be retracted below the level of the associated supporting surface 2. In one specific form of embodiment, the jacks 4 are of the screw type and comprise respectively a nut 4a rigidly connected to the retractable portion 3d of the middle rail 3, and a screw 4b which is restrained axially by suitable abutments. A transmission system consisting of worm-and-gear drives 5 and a multiple-section shaft 22 causes the screws 4b of a plurality of jacks to be driven by a common motor 7. Provided in the body of a supporting portion 2 of the track is at least one guiding groove 6, consisting, say, of a channel-section metal member embedded in the concrete forming the track proper, or of any other similarly convenient means. This groove must necessarily be positioned laterally since the guide rail 3 is located along the centerline, and said groove may have sloping rather than vertical flanks in cross-section (see FIGURE 3a).

FIGURES 3a, 3b and 6 through 9 illustrate a preferred form of embodiment of the auxiliary guiding device carried by the vehicle and cooperating with a suitable groove 6 formed in the track 2. On the left-hand side of FIGURE 3a is shown a raisable guiding wheel or roller 8 carried on a horizontal transverse shaft and cooperating with a groove 6a having sloping sides. By way of example, the wheel 8 may to that end be mounted on a longitudinal arm 9 pivotally connected at 9a to the vehicle chassis 1 and controlled by a jack 10, which jack may accessorily serve for locking the wheel and damping its vertical movement (see FIGURE 6).

Figure 11:
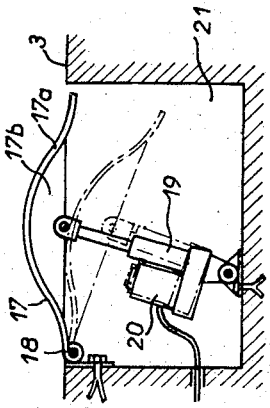
FIGURE 11 is a detail view of the constructional form of a middle rail preceding points in the track.

The raising of the wheel 8 can be rendered automatic by means of an inclined surface 6b which is preferably retractable through the agency of a device illustrated in FIGURE 11 and described hereinbelow, and which terminates in a groove 6 and may project locally as at 6c above the level of track 2 whereby to lock said wheel in its raised position by any convenient means such as an ordinary mechanical spring lock 11 (see FIGURES 5 and 6).

In an alternative embodiment, the wheel 8 may serve only to determine the vertical position, in a groove 6, of at least one guiding wheel 12 rotatable about a vertical axis. Two such wheels 12a and 12b may be arranged with slight lateral offset (as shown on the right-hand side of FIGURE 3b) in order to provide a bilateral connection eliminating sudden changes in the directions of their rotation. These wheels which, like the wheels 8, may be fitted with pneumatic tyres, are carried by a cradle 13 which a slideway 14 or the like guides in relation to the vehicle chassis and the vertical position of which is determined by a link 15 pivotally connected to the end of the arm 9 carrying the wheel 8.

Figure 9:
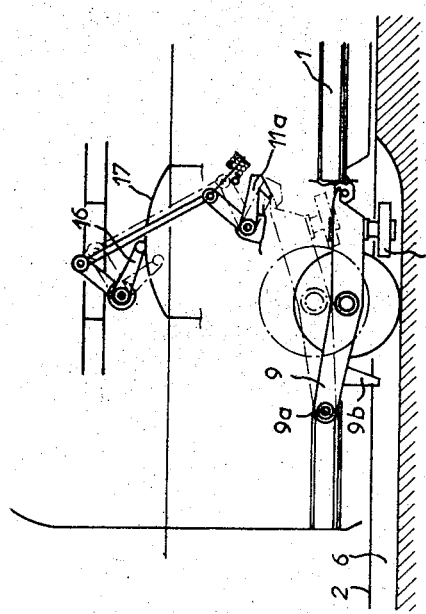
Figure 7:
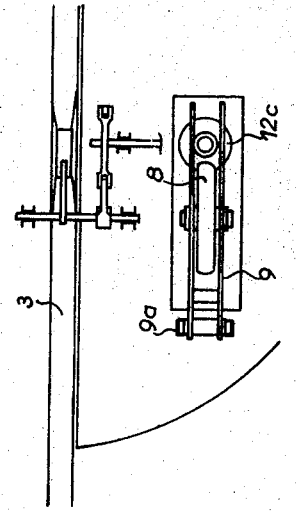

Reference is next had to FIGURES 7 through 9 for a second alternative embodiment of such a device, in which the locking and unlocking are purely mechanical. On these figures, a single wheel 12c is mounted directly on the arm 9, latching of which in the uppermost position is again obtained through the wheel 8 running over a suitable protrusion 6c on the track. In this example, however, the lock 11a is connected through a linkage system to a lever 16 acting as a sensor and adapted to be raised by a track protrusion 17 located, say, on the crest of the rail 13. The lever 16 shifts the lock 11a, thus causing the arm 9 to drop once more. Obviously, the protrusion 17 may be retractable and remote-controlled in order to enable air cushion vehicles travelling at crusing speed to move over points along a main track without accidental lowering of the auxiliary guiding device with which these vehicles are equipped and which is normally intended for relatively low speeds only. FIGURE 11 shows a possible constructional form of a remote-controlled protrusion mounted on a pivot as at 18 and operated by a mechanical screw-jack 19 driven by an electric motor 20.

FIGURE 10 schematically illustrates a terminal station with multiple platforms, associated to a branch feeder line leading to a shed or to maintenance shops. It is to be noted that the vertical guide rails 3 are interrupted over the entire length of a platform formed by the union of the supporting portions 2. The guiding grooves 6 form on the surface of this platform a pattern of recessed tracks of conventional design, comprising for instance points of any known type, and most notably points operating automatically in a given direction of travel, as schematically illustrated in FIGURE 12. An abutment 9b carried by the arm 9 ahead of the wheel 8 causes these automatic points to open when they are negotiated in the right direction (indicated by dot-dash arrows in FIGURE 12).

Operation of the device hereinbefore described involves the use of a control and signalling system which may be of the conventional type. The driver of a vehicle, having been warned by suitable signals, will approach a set of points according to the invention at moderate speed. A little before passing over the points, and responsively to a manual or automatic control action transmitted, in the automatic mode for instance, by a protrusion 17 on the track (FIGURE 11), the wheels 8 of two auxiliary guiding devices, located on the appropriate side and at the front and rear of the vehicle respectively, are lowered into a guiding groove 6 before the break in the associated rail 3, and in so doing possibly carry with them wheels 12 (see FIGURE 4). The wheels 8 positioned on the other side of the vehicle (if two sets of wheels are used in conjunction with a single groove 6) can be locked in the retracted position by any convenient means controlled by the driver, and will serve only in the other direction of travel along the track.

The protrusion 17 is formed of a contoured steel plate 17a stiffened by a gusset 17b and is pivotable about a shaft 18 in response to a jack 19 operated by an electric motor 20. It is to be understood that said jack 19 could be of the hydraulic or pneumatic type. The protrusion 17 retracts into a recess 21 in the guide rail 3 when the movable portion of the latter is in position, thereby to permit high speed travel by vehicles which do not require to switch tracks. The movements of the protrusion 17 and of the movable portion 3d of the guide rail may take place responsively to common control means in addition to their individual control means. The specific form of embodiment of the retractable protrusion 17 hereinbefore described may be associated with advantage to the inclined surface 6b, 6c.

After the points have been crossed and the vehicle is situated above a rail 3 once more, the wheels 8 are raised, for instance by means of an ordinary inclined surface such as the surface 6b, 6c which causes them to be locked in their raised position (see FIGURES 5 and 6).

As an alternative to the slidable mounting of wall element 3d for retraction purposes, as illustrated in the drawings, this element may be pivotally mounted and retracted by angular displacement.

What is claimed is:

1. In a track system for a ground effect machine, having at least two distinct sections for guiding said machine therealong, a device for switching said machine from one such section to the other, comprising an interconnecting track portion extending between and merging with said sections, said track portion comprising a bearing surface for said machine, and a groove formed on said bearing surface and designed for accommodating a guide member carried by said machine and engaging said groove during a marshalling operation.

2. A device as claimed in claim 1, wherein said sections comprise a groove formed thereon over a short distance at the mergence of each section with said interconnecting track portion, said latter-mentioned groove having a cross-sectional design similar to that of said former-mentioned groove and merging therewith.

3. A device as claimed in claim 2, wherein said latter-mentioned groove formed in each section ends with a terminal ramp merging with the bottom of said groove.

4. A device as claimed in claim 3, wherein said ramp comprises a portion protruding from said section.

5. A device as claimed in claim 2, wherein said latter-mentioned groove formed in each section extends straight-on in said section beyond its mergence with said former-mentioned groove formed in said interconnecting track portion.

6. A device as claimed in claim 5, further comprising a controllable flap fitted at said mergence of the grooves and movable from a position wherein said flap shuts off said straight-on extension of said latter-mentioned groove and opens said former-mentioned groove, to another position wherein said flap shuts off said former-mentioned groove and opens said straight-on extension of said latter-mentioned groove.

7. A device as claimed in claim 1, further comprising a lateral extension in each of said sections at the mergence thereof with said interconnecting track portion and at the side thereof remote from the other section.

8. A device as claimed in claim 1, wherein said sections are of the kind comprising a substantially horizontal, upwardly exposed bearing surface and a substantially vertical, laterally exposed guiding wall positioned intermediate the edges of said sections, extending longitudinally with respect thereto and projecting upwardly therefrom, and wherein said guiding wall is discontinued at the mergence of said sections with said interconnecting track portion.

9. A device as claimed in claim 8, further comprising a movable vertical wall element controllable to an operative position whereby it forms an extension of said guiding wall where the same is discontinued, and to a retracted position whereby a gap is displayed where said guiding wall is discontinued.

10. A device as claimed in claim 9, wherein said vertical wall element is slidably movable in a substantially vertical plane, and wherein said sections comprise a recessed housing formed therein and into which said wall element is retractable.

11. A device as claimed in claim 10, further comprising a screw-jack positioned in said recessed housing and controlling said slidably movable wall element.

12. A device as claimed in claim 11, wherein said wall element is hollow and said screw-jack projects thereinto as said wall element moves to retracted position.

13. A device as claimed in claim 11, comprising a plurality of like screw-jacks spaced out in said recessed housing lengthwise of said wall element, and interconnecting drive means for simultaneously operating said screw-jacks in synchronism.

14. A device as claimed in claim 10, further comprising cam-like means positioned on said guiding wall in the vicinity of the discontinuance thereof and engageable by operative feeler means carried by said machine.

15. A device as claimed in claim 14, wherein said cam-like means is retractable, said device further comprising remote-controlled cam actuating means for putting said cam-like means selectively in an operative position and in a retracted position.

16. A transportation system by ground effect machine movable on distinct guiding track sections and switchable from one section to another at an interconnecting track portion extending between and merging with said sections, wherein the improvement comprises the combination of:
a switching device comprising a bearing surface for said machine formed on said track portion, and a groove formed on said bearing surface, and
a guiding device comprising a retractable guide member carried by said machine and projectable therefrom to engage said groove.

17. In a ground effect machine guidedly movable along a track system having distinct sections and switchable from one to another at an interconnecting track portion extending therebetween and merging therewith, said track portion being formed with a guide groove, a machine guiding device comprising a support movable with respect to said machine substantially perpendicularly to the plane of motion thereof but fast against displacement in said plane, and two rollers mounted for free rotation on said support but fast against lateral displacement with respect thereto, said two rollers being rotatable respectively about a horizontal axis and about a vertical axis and being inoperative when said movable support is in a retracted position but engaging said guide groove during marshalling of said machine on said track portion when said movable support is in an extended position.

18. In a ground effect machine guidedly movable along a track system having distinct sections and switchable from one to another at an interconnecting track portion extending therebetween and merging therewith, said track portion being formed with a guide groove, a machine guiding device comprising a support movable with respect to said machine substantially perpendicularly to the plane of motion thereof but fast against displacement in said plane, a roller mounted for free rotation on said support but fast against lateral displacement with respect thereto, said roller being inoperative when said movable support is in a retracted position but engaging said guide groove during marshalling of said machine on said track portion when said movable support is in an extended position, actuating means for urging said support into said extended position and said roller into engagement with said guide groove, and locking means for maintaining said support in said retracted position and said roller inoperative.

19. A device as claimed in claim 18, further comprising a cam feeler member carried by said machine and operatively connected to said locking means for unlocking the same upon said feeler member engaging a cam on said track system.

20. In a ground effect machine guidedly movable along a track system having distinct sections and switchable from one to another at an interconnecting track portion extending therebetween and merging therewith, said track portion being formed with a guide groove, a machine guiding device comprising a support movable with respect to said machine substantially perpendicularly to the plane of motion thereof but fast against displacement in said plane, two rollers rotatable about a substantially vertical axis and mounted for free rotation on said support but fast against lateral displacement with respect thereto, said rollers being inoperative when said movable support is in a retracted position but engaging said guide groove during marshalling of said machine on said track portion when said movable support is in an extended position, and said rollers being in mutual substantially tangent arrangement for respective contact engagement with opposite sides of said guide groove.

References Cited

UNITED STATES PATENTS

| 3,106,898 | 10/1963 | Prosin | 104—121 X |
| 3,238,894 | 3/1966 | Marksim | 104—121 |
| 3,257,964 | 6/1966 | Conners | 104—134 |

FOREIGN PATENTS

| 14,459 | 8/1896 | Great Britain. |

ARTHUR L. LA POINT, *Primary Examiner.*

J. E. BABER, *Assistant Examiner.*